United States Patent [19]
Hirafune et al.

[11] Patent Number: 6,015,627
[45] Date of Patent: *Jan. 18, 2000

[54] MAGNETIC HEAD DRUM AND METHOD OF MANUFACTURING SAME

[75] Inventors: Yasuhiro Hirafune, Saitama; Akio Kikuchi, Aichi, both of Japan

[73] Assignees: Sony Corporation; Sumitomo Light Metal Industries, Ltd., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/922,859

[22] Filed: Sep. 3, 1997

Related U.S. Application Data

[63] Continuation of application No. 08/440,697, May 15, 1995, abandoned, which is a continuation-in-part of application No. 08/317,216, Oct. 3, 1994, abandoned, which is a continuation of application No. 07/733,164, Jul. 19, 1991, abandoned.

[30] Foreign Application Priority Data

Aug. 3, 1990 [JP] Japan .................................... 2-006052

[51] Int. Cl.[7] ...................................................... B22F 7/04
[52] U.S. Cl. ............................ 428/553; 75/249; 360/84; 360/107; 360/130.24; 419/7; 419/49
[58] Field of Search .................................... 428/547, 548, 428/551, 552, 553, 554, 555, 556, 557, 564; 75/249; 360/84, 107, 130, 24; 419/6, 7, 8, 9, 48, 49, 51

[56] References Cited

U.S. PATENT DOCUMENTS

| | | |
|---|---|---|
| 3,065,073 | 11/1962 | Hug ............................................ 75/208 |
| 3,236,700 | 2/1966 | Heimke et al. ....................... 148/31.57 |
| 3,807,966 | 4/1974 | Butcher et al. ......................... 29/182.2 |
| 4,068,270 | 1/1978 | Hurd et al. ................................. 360/84 |
| 4,090,873 | 5/1978 | Takamura et al. ..................... 75/208 R |
| 4,163,266 | 7/1979 | Tamamura et al. ........................ 360/84 |
| 4,376,961 | 3/1983 | Torii et al. ............................... 360/106 |
| 4,523,245 | 6/1985 | Takahashi .......................... 360/130.21 |
| 4,669,019 | 5/1987 | Kuroda ............................... 360/130.24 |
| 4,844,863 | 7/1989 | Miyasaka et al. .......................... 419/8 |
| 4,966,748 | 10/1990 | Miyasaka et al. .......................... 419/8 |
| 4,985,795 | 1/1991 | Gooch ..................................... 360/115 |
| 5,012,572 | 5/1991 | Matsuzawa et al. ....................... 29/603 |
| 5,043,123 | 8/1991 | Gormanns et al. ..................... 264/113 |

FOREIGN PATENT DOCUMENTS

| | | | |
|---|---|---|---|
| 2489571 | 3/1982 | France . | |
| 2803683 | 8/1978 | Germany . | |
| 3544632 | 7/1986 | Germany . | |
| 55-89940 | 7/1980 | Japan | ................ 360/130.24 |
| 85-0824 | 4/1984 | Japan . | |
| 60-223057 | 11/1985 | Japan . | |
| 881221 | 2/1987 | Japan . | |
| 63-175216 | 7/1988 | Japan | ................ 360/130.24 |
| 63-211151 | 9/1988 | Japan | ................ 360/130.24 |

*Primary Examiner*—Kathryn Gorgos
*Assistant Examiner*—Thomas H Parsons
*Attorney, Agent, or Firm*—Hill & Simpson

[57] ABSTRACT

A head drum for supporting a magnetic head for magnetically recording information on and reproducing information from a magnetic tape includes an inner body of an aluminum alloy, and a wear-resistant layer of a sintered powdery alloy disposed around an outer circumference of the inner body in at least a region for sliding contact with an elongate magnetic recording medium. The wear-resistant layer has a thickness of at least 0.2 um, and the sintered powdery alloy comprises a powdery alloy of 17 to 38% of Si, 0.5 to 5% of Cu, 0.3 to 5% of Mg, and the remainder of aluminum.

4 Claims, 4 Drawing Sheets

Structure Shown at a
Magnification of 100 Times

Structure Shown at a
Magnification of 100 Times

Structure Shown at a
Magnification of 400 Times

Structure Shown at a
Magnification of 400 Times

MAGNETIC HEAD DRUM AND METHOD OF MANUFACTURING SAME

This is a continuation of application Ser. No. 08/440.697, filed May 15, 1995 (now abandoned), which application is a continuation-in-part of U.S. application Ser. No. 08/317,216 filed Oct. 3, 1994 (now abandoned), which is a continuation of U.S. application Ser. No. 07/733,164 filed July 19, 1991 (now abandoned).

BACKGROUND OF THE INVENTION

1. Field of the Invention

The present invention relates to a magnetic head drum or cylinder for use in a helical-scan magnetic recording and reproducing apparatus such as a VTR, an R-DAT, or the like.

2. Description of the Prior Art

In VTRs, R-DATs, or similar helical-scan magnetic recording and reproducing apparatus, desired information is recorded on and reproduced from magnetic tapes by rotary magnetic heads. The rotary magnetic heads are supported on a rotatable head drum or cylinder. Heretofore, the head drum is made of an aluminum alloy. However, since the magnetic tape is held in sliding contact with the outer circumferential surface of the head drum assembly, the head drum tends to be worn rapidly, particularly at a lead edge for guiding an edge of the magnetic tape. Such excessive wear of the head drum causes a compatibility problem.

In view of the above drawback, it was once customary to employ head drums of a commercially available aluminum alloy such as "AC8B" which is an Al-Si-Cu-Mg alloy, or "AHS" which is an eutectic malleable material containing 10 to 20% by weight of Si. However, since no sufficient durability is achieved by the above aluminum alloys (AC8B, AHS), present head drums are made of the powder of an Al-Si alloy containing 20 to 30% by weight of Si.

AC8B is defined in the Japanese Industrial Standards as containing the following percent by weight ranges of constituents. Cu 2.0 to 4.0, Si 8.5 to 10.5, Mg 0.5 to 1.5, Zn 0.5, Fe 1.0, Mn 0.5, Ni 0.1 to 1.0, Ti 0.2, Pb 0.1, Sn 0.1, Cr 0.1. AHS is defined in the Japanese Industrial Standards as containing in percent by weight Si 11.0 to 13.5, Fe 1.0, Cu 0.5 to 1.3, Mg 0.8 to 1.3, Cr 0.1, Ni 0.5 to 1.3, Zn 0.25.

Japanese Laid-Open Patent Publication No. 56-156956 discloses a head drum which has a surface for sliding contact with a magnetic tape, the surface being provided by a surface layer that is made of a wear-resistant material different from the material of the head drum proper. The surface layer is joined to the head drum proper by a pressure fit, a shrink fit, adhesive bonding, insert molding, or the like.

The head drums which are made of the powder of an Al-Si alloy containing 20 to 30% by weight of Si are disadvantageous in that the cost of the material is 4 to 5 times higher than ordinary aluminum alloys. In addition, since the entire head drums are made of a wear-resistant material, they cannot easily be machined by cutters, drill bits, and tapping screws, or require many machining steps until they are finished.

With the head drum having a surface layer, it is necessary to fabricate the surface layer separately, and also to join the surface layer to the head drum proper by a pressure fit, a shrink fit, adhesive bonding, insert molding, or the like. Since there is a clear boundary between the head drum proper and the surface layer, they are not joined with sufficient bonding strength, or the surface layer is apt to come off easily.

OBJECTS AND SUMMARY OF THE INVENTION

In view of the aforesaid drawbacks of the conventional head drums, it is an object of the present invention to provide a head drum or cylinder for supporting rotary heads for magnetic recording, the head drum having a firmly coupled wear-resistant layer but being still as easily machinable as conventional head drums.

Another object of the present invention is to provide a method of manufacturing such a head drum or cylinder.

According to the present invention, there is provided a head drum for supporting a magnetic head for magnetic recording and reproducing, comprising an inner body of an aluminum alloy and a wear-resistant layer of a sintered powdery alloy disposed around an outer circumference of the inner body in at least a region for sliding contact with an elongated magnetic recording medium, the wear-resistant layer having a thickness of at least 0.2 mm, the sintered powdery alloy comprising a powdery alloy of 17 to 38% of Si, 0.5 to 5% of Cu, 0.3 to 5% of Mg, by weight and the remainder of aluminum.

Since the wear-resistant layer which is at least 0.2 mm thick is disposed for sliding contact with the elongated magnetic recording medium, the head drum is rendered resistant to wear due to sliding contact with the elongate magnetic recording medium.

The particles of Si of the powdery alloy have an average diameter ranging from 1 to 8 um.

The average diameter, ranging from 1 to 8 um, of the particles of Si is effective to increase the wear resistance of the wear-resistant layer by more than twice that of ordinary wear-resistant alloys, and also achieve low friction characteristics.

According to the present invention, there is also provided a method of manufacturing a head drum for supporting a magnetic head for magnetic recording and reproducing, comprising the steps of inserting a solid body of an aluminum alloy into a container, filling a gap between the solid body and the container with a powder of a wear-resistant material, sintering the powder in the gap with heat applied externally to the container, thereby joining the sintered powder to the solid body, thereby providing a blank, removing the container from the blank, and forging the blank into a head drum.

The sintered powder of the wear-resistant material is firmly joined to the aluminum alloy of the solid body, so that they are strongly bonded to each other.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Embodiment 1

A method of manufacturing a head drum for supporting magnetic heads for magnetic recording according to an embodiment of the present invention will be described below with reference to FIGS. 1 through 5.

Figure 1:
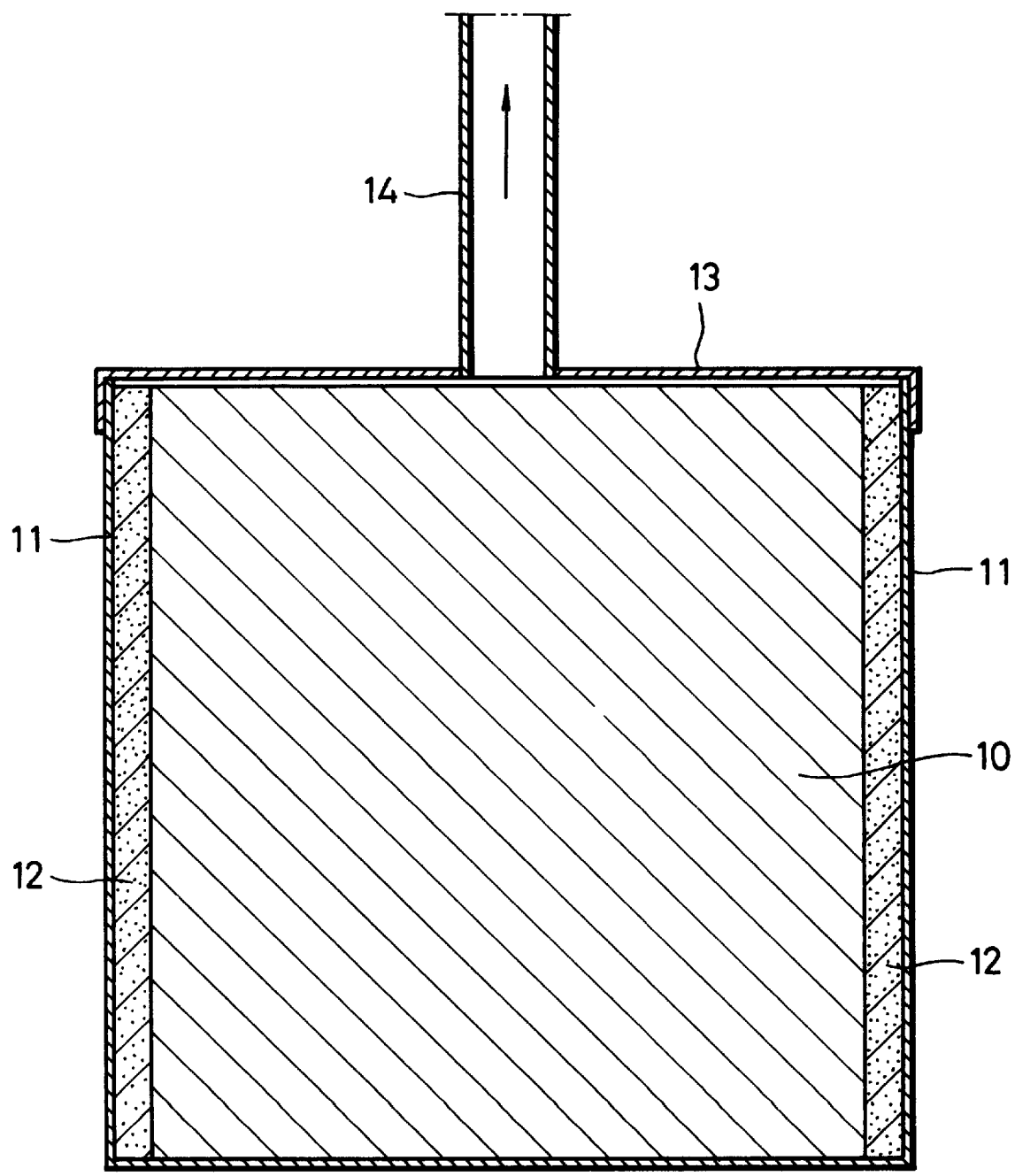
FIG. 1 is a vertical cross-sectional view of a container used in a method of manufacturing a head drum according to an embodiment of the present invention.

As shown in FIG. 1, a solid extruded body 10 of aluminum alloy is prepared-at first. The solid extruded body 10 may be produced from an ingot of aluminum alloy which may be manufactured by the melt casting process. The aluminum alloy may be an Al-Mg alloy, an Al-Mg-Si alloy, an Al-Cu alloy, or an Al-Zn-Mg alloy. For example, an aluminum alloy represented by A-2218 is used in the illustrated embodiment. The extruded body 10 is inserted into a hollow cylindrical container 11 of aluminum alloy with a closed bottom. The internal diameter of the container 11 is slightly greater than the outside diameter of the extruded body 10, with a small gap left therebetween.

The gap between the extruded body 10 and the container 11 is filled with a powder 12 of wear-resistant material. In this embodiment, the powder 12 comprises a powdery alloy which contains 17~25% of Si, 0.5~5% of Cu, 0.3~5% of Mg, by weight and the remainder of aluminum.

After the powder of wear-resistant material is filled up in the gap between the extruded body 10 and the container 11, the upper opening of the container 11 is covered with a cover 13 which is firmly sealed on the container 11 by brazing. The cover 13 is equipped with a deaerating pipe 14. Then, heat and pressure are applied externally to the container 11 closed by the cover 13, effecting hot pressing on the alloy powder 12 filled in the gap between the extruded body 10 and the container 11. For example, the hot pressing is carried out at a temperature of 520° c. under a pressure of 1000 kg/cm2. When the alloy powder 12 is subjected to the hot pressing, it is sintered into a wear-resistant layer 15 which is firmly joined to the outer circumference of the extruded body 10. Specifically, at the same time that the alloy powder 12 is sintered, the alloy of the powder 12 and the alloy of the extruded body 10 are joined to each other.

Figure 2:
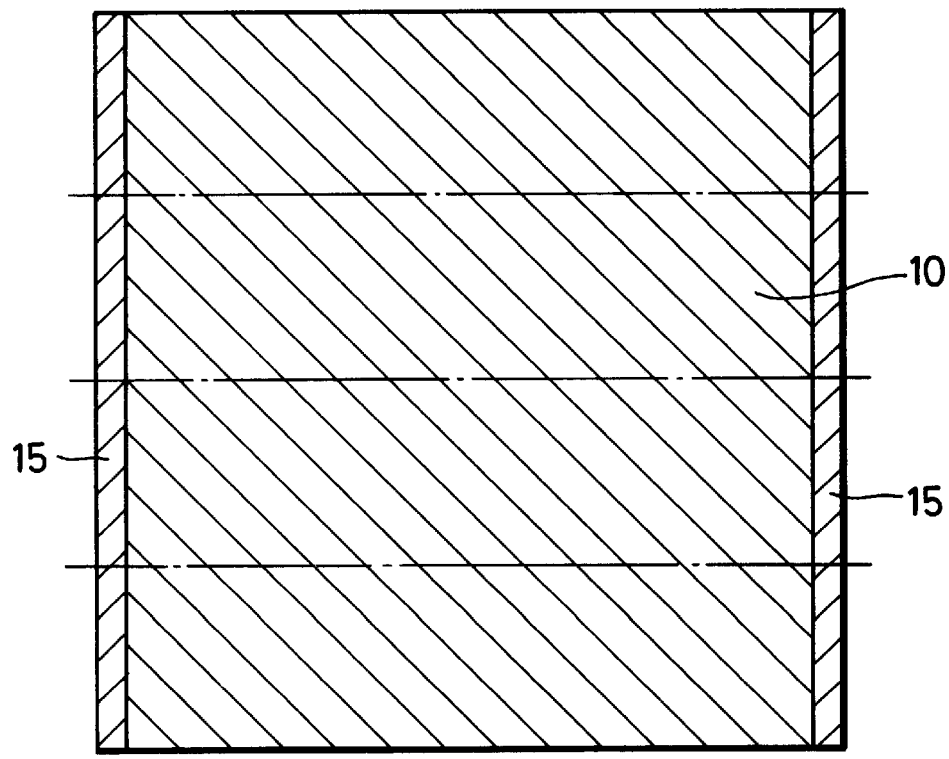
FIG. 2 is a vertical cross-sectional view of a blank cylinder from which the container has been removed by cutting-off.
Figure 3:
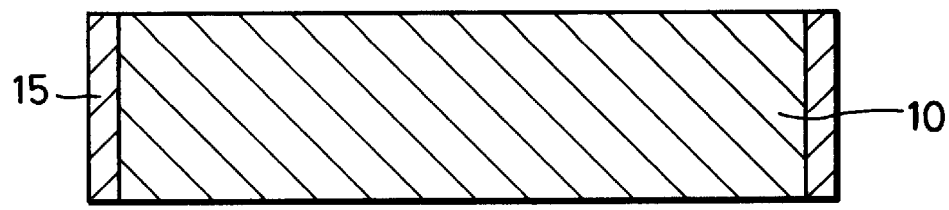
FIG. 3 is a vertical cross-sectional view of one of blank discs sliced from the blank cylinder shown in FIG. 2.
Figure 4:
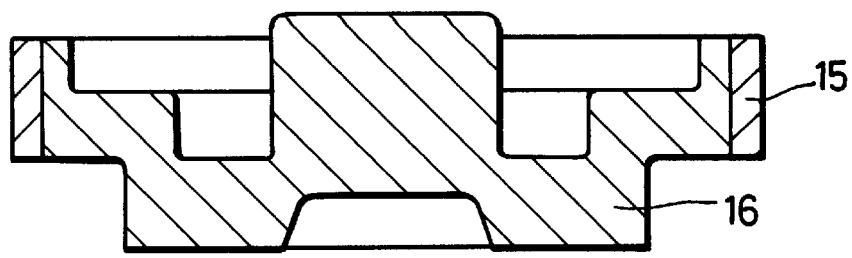
FIG. 4 is a vertical cross-sectional view of a blank component forged from the blank disc shown in FIG. 3.
Figure 5:
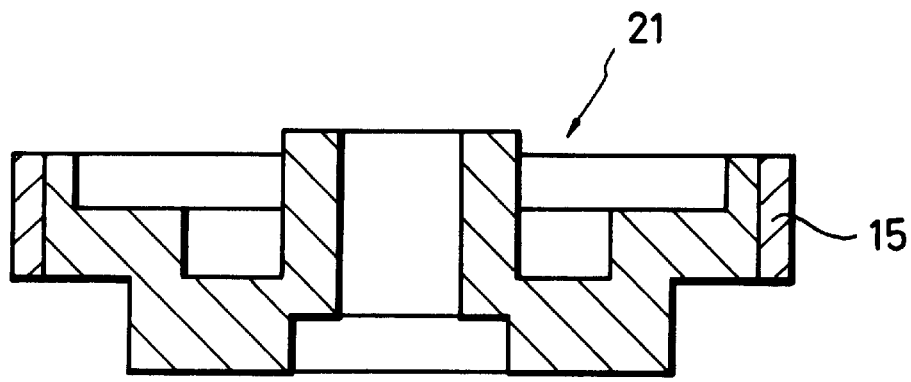
FIG. 5 is a vertical cross-sectional view of a head drum machined from the blank component shown in FIG. 4.

Thereafter, the container 11 is removed by cutting-off, leaving a blank cylinder as shown in FIG. 2. The blank cylinder is then sliced along planes indicated by the dot-and-dash lines, providing a plurality of flat blank discs, one of which is shown in FIG. 3. Then, the blank disc is forged into a blank component 16 (FIG. 4) which includes at its outer circumference the wear-resistant layer 15, the blank component 16 proper being composed of the extruded body 10. The blank component 16 is thereafter machined into a magnetic head drum 21 as shown in FIG. 5.

Figure 6:
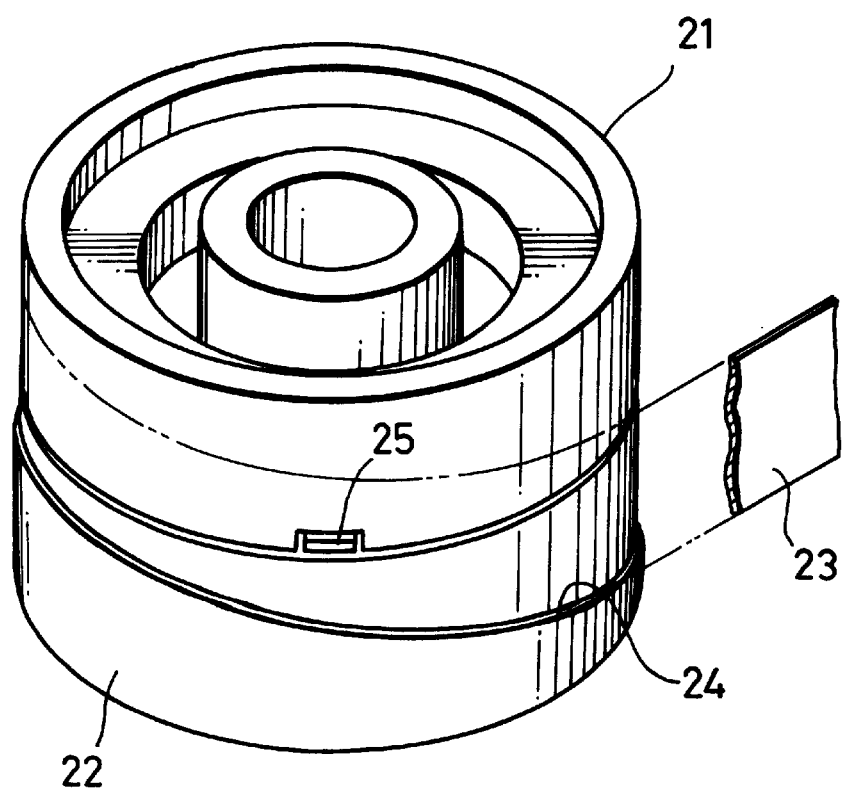
FIG. 6 is a perspective view of a head drum assembly composed of upper and lower head drums.
Figure 7:
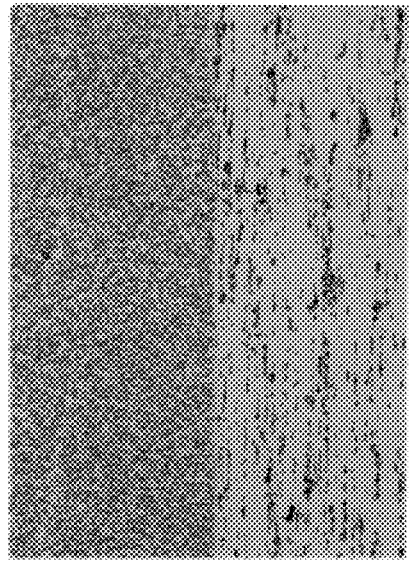
FIG. 7 is a microscopic representation of the structure of a boundary between a wear-resistant layer and a head drum body, the structure being shown at a magnification of 100 times.
Figure 8:
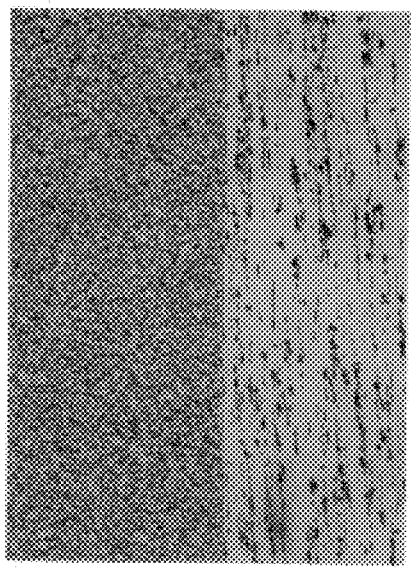
FIG. 8 is a microscopic representation of a boundary structure of a head drum according to another head drum.
Figure 9:
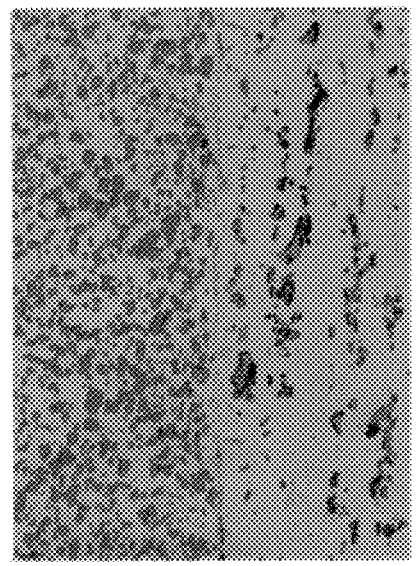
FIG. 9 is a microscopic representation of the structure of a boundary between a wear-resistant layer and a head drum body, the structure being shown at a magnification of 400 times.
Figure 10:
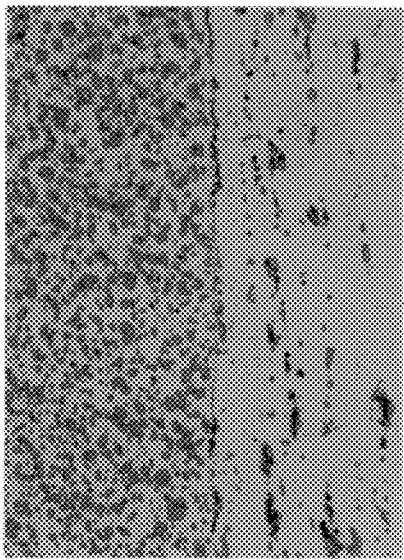
FIG. 10 is a microscopic representation of a boundary structure of a head drum according to another head drum.

The head drum 21 is combined with another head drum 22 which is also manufactured in the same manner as described above, thereby providing a magnetic head drum assembly for use in a VTR as shown in FIG. 6. When the magnetic head drum assembly is in use, a magnetic tape 23 is trained around the magnetic head drum assembly. A lower edge of the magnetic tape 23 is guided by a lead edge 24 on the outer circumference of the lower head drum 22. The upper drum 21 supports a magnetic head 25 which is held in sliding contact with the magnetic tape 23. When the magnetic head drum assembly rotates about its own axis, the magnetic head 25 scans the magnetic tape 23 to record information on or reproduce information from the magnetic tape 23 according to the helical-scan recording or reproducing process.

The wear-resistant layer 15 may not necessarily extend over the entire circumferential surface of the head drum 21, but may extend only in the region which is contacted by the magnetic tape 23. The wear-resistant layer 15 should be of a thickness of 0.2 mm or more. In this embodiment, the particles of Si of the powdery alloy of the wear-resistant layer 15 have an average diameter ranging from 1 to 4 um. The head drum thus fabricated has a wear resistance which is about three times greater than the wear resistance of a conventional head drum that is made of an aluminum alloy containing 10% of Si or 8% of Si by weight. The head drum is suitable for use in VTRs for home use.

As described above, each of the head drums 21, 22 has its outer circumference constructed as the layer 15 of sintered powder aluminum alloy which is highly resistant to wear due to the abrasive contact with the magnetic tape and is also low in frictional characteristics, and also has its inner body constructed of an aluminum alloy that is highly machinable as it is produced according to the melt casting process. The wear resistance of the head drums 21, 22 is at least twice the wear resistance of the conventional head drums of an aluminum alloy containing Si. The head drums 21, 22 also have improved resistance to wear caused by contact with a coated-metal tape.

Since only the outer circumference of each of the head drums 21, 22 is in the form of the very thin wear-resistant layer 15 and the inner body of the normal aluminum alloy, the entire cost of the head drums may be ⅓ or less of the cost of head drums which are made up of sintered powder alloy in their entirety. Accordingly, the cost of the materials used is greatly reduced. Inasmuch as the head drums 21, 22 are made of a highly machinable aluminum alloy except for the outer circumference thereof, any cutters, drill bits, or tapping screws used to machine the head drums have a long service life. The high machinability of the head drums 21, 22 reduces the number of machining steps required to machine them, to ⅔ or less of the number of machining steps for the conventional head drums of sintered powder alloy.

In each of the head drums 21, 22, the wear-resistant layer 15 is made of a sintered alloy, and its alloy is firmly joined to the aluminum alloy of the inner body of the head drums. FIGS. 7 through 10 are illustrative of microscopic photographs of the structures of boundaries between the wear-resistant layer 15 and the inner body, at various magnifications, of different head drums according to the present invention. The microscopic representations of FIGS. 7 through 10 indicate that the aluminum alloy structures of the wear-resistant layer and the inner body are firmly joined to each other in the boundary therebetween.

Embodiment 2

A powdery aluminum alloy containing 23 to 28% of Si, 0.5 to 5% of Cu, 0.3 to 5% of Mg by weight, and the remainder of aluminum was used to make up a wear-resistant layer 15, with the particles of Si having an average diameter ranging from 2 to 5 mm. When the powdery aluminum alloy was sintered, a wear-resistant layer 15 having a thickness of at least 0.2 mm was formed on the outer circumference of the head drum. The aluminum alloy of an inner extruded body 10 was the same as that used in Embodiment 1 above.

Head drums 21, 22 each having the wear-resistant layer 15 of the above powdery alloy composition were suitable for use in head drum assemblies for medium and top range magnetic recording and reproducing apparatus.

Embodiment 3

A powdery aluminum alloy containing 27 to 38% of Si, 0.5 to 5% of Cu, 0.3 to 5% of Mg by weight, and the remainder of aluminum was used to make up a wear-resistant layer 15, with the particles of Si having an average diameter ranging from 2 to 8 um. When the powdery aluminum alloy was sintered, a resultant wear-resistant layer 15 had a thickness of 0.2 mm or more. The aluminum alloy of an inner extruded body 10 was the same as that used in Embodiment 1 above.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A magnetic head drum on which a magnetic head for magnetic recording and reproducing is supported, comprising:

an inner body made of an aluminum alloy and having an outer cylindrical circumference; and a wear-resistant layer of a sintered powdery alloy disposed around said outer circumference of said inner body, said wear-resistant layer integrally formed on said inner body by sintering in place in at least a region for sliding contact between the head drum and an elongate magnetic recording medium, said wear-resistant layer having a thickness of at least 0.2 mm. said sintered powdery alloy comprising a powdery alloy of 17 to 38% of Si particles, 0.5 to 5% of Cu, 0.3 to 5% of Mg by weight, and the remainder of aluminum, said sintered alloy material being completely alloy-coupled to said inner body and thereby exhibiting no defined boundary between the inner body and the wear-resistant layer, said particles of Si of said powdery alloy having an average diameter ranging from 1 to 8 $\mu$m, said particles of said powdery alloy having Si particles no larger than 8 $\mu$m in diameter.

2. A head drum according to claim 1, wherein said sintered powdery alloy comprises a powdery alloy of 17 to 25% of Si, 0.5 to 5% of Cu, 0.3 to 5% of Mg all by weight, and the remainder of aluminum.

3. A head drum according to claim 1, wherein said sintered powdery alloy comprises a powdery alloy of 23 to 28% of Si, 0.5 to 5% of Cu, 0.3 to 5% of Mg all by weight, and the remainder of aluminum.

4. A head drum according to claim 1, wherein said sintered powdery alloy comprises a powdery alloy of 27 to 38% of Si, 0.5 to 5% of Cu, 0.3 to 5% of Mg all by weight, and the remainder of aluminum.

\* \* \* \* \*